(12) United States Patent
Marumoto et al.

(10) Patent No.: US 9,121,697 B2
(45) Date of Patent: Sep. 1, 2015

(54) WEAR AMOUNT MEASURING DEVICE, WEAR AMOUNT MEASURING METHOD, WEAR AMOUNT MEASURING PROGRAM AND STORAGE MEDIUM

(75) Inventors: Shigeto Marumoto, Hirakata (JP); Hideyuki Wakai, Yashio (JP); Yukihiro Suzaki, Kawasaki (JP); Daijirou Itou, Hirakata (JP); Tomoyuki Tsubaki, West Java (ID); Kenichi Hisamatsu, Hirakata (JP)

(73) Assignee: KOMATSU LTD., Tokyo (JP)

(*) Notice: Subject to any disclaimer, the term of this patent is extended or adjusted under 35 U.S.C. 154(b) by 456 days.

(21) Appl. No.: 13/509,770

(22) PCT Filed: Jan. 19, 2011

(86) PCT No.: PCT/JP2011/050803
§ 371 (c)(1),
(2), (4) Date: Aug. 21, 2012

(87) PCT Pub. No.: WO2011/099337
PCT Pub. Date: Aug. 18, 2011

(65) Prior Publication Data
US 2012/0306916 A1 Dec. 6, 2012

(30) Foreign Application Priority Data

Feb. 10, 2010 (JP) ................................ 2010-027146

(51) Int. Cl.
G09G 5/00 (2006.01)
G01B 21/20 (2006.01)
G01B 11/24 (2006.01)

(52) U.S. Cl.
CPC ................ *G01B 21/20* (2013.01); *G01B 11/24* (2013.01)

(58) Field of Classification Search
CPC ...... B62D 55/088; B62D 55/13; B62D 55/21; G01B 11/06
USPC ......................................................... 345/632
See application file for complete search history.

(56) References Cited

U.S. PATENT DOCUMENTS

2004/0012260 A1 1/2004 Yamamoto et al.
2011/0279828 A1 11/2011 Matsumoto et al.

FOREIGN PATENT DOCUMENTS

CN 101549468 A 10/2009
JP 5-52536 A 3/1993
(Continued)

OTHER PUBLICATIONS

Chinese Office Action for the corresponding Chinese application No. 201180004779.9, issued on Nov. 29, 2013.
(Continued)

*Primary Examiner* — Peter Hoang
(74) *Attorney, Agent, or Firm* — Global IP Counselors, LLP

(57) ABSTRACT

A wear amount measuring device includes an image display unit, an image processing unit, and a wear amount computing unit. The image display unit displays a real object image based on real object image data containing a wear amount measurement target and a reference part, and displays a plan image based on design plan data containing the wear amount measurement target and the reference part. The image processing unit executes an image processing of overlapping the real object image and the plan image at an equal scale on a corresponding positional relation when the reference parts are matched. The wear amount computing unit computes a wear amount based on a magnitude of an interval between a measurement contour line drawn along a contour of the wear amount measurement target in the real object image and a plan contour line in the plan image.

20 Claims, 12 Drawing Sheets

(56) References Cited

FOREIGN PATENT DOCUMENTS

| JP | 8-159718 A | 6/1996 |
|---|---|---|
| JP | 8-257876 A | 10/1996 |
| JP | 2002-283439 A | 10/2002 |
| JP | 2003-285781 A | 10/2003 |
| JP | 2005-173336 A | 6/2005 |
| JP | 2007-318555 A | 12/2007 |
| JP | 2008-180619 A | 8/2008 |
| JP | 2008-224484 A | 9/2008 |
| JP | 2009-204604 A | 9/2009 |

OTHER PUBLICATIONS

International Search Report of corresponding PCT Application No. PCT/JP2011/050803.

WEAR AMOUNT MEASURING DEVICE, WEAR AMOUNT MEASURING METHOD, WEAR AMOUNT MEASURING PROGRAM AND STORAGE MEDIUM

CROSS-REFERENCE TO RELATED APPLICATIONS

This application claims priority to Japanese Patent Application No. 2010-027146, filed on Feb. 10, 2010, the disclosure of which is hereby incorporated herein by reference in its entirety.

TECHNICAL FIELD

The present invention relates to a wear amount measuring device, a wear amount measuring method, a wear amount measuring program and a storage medium for measuring the wear amount of an expendable part such as a sprocket wheel embedded in a track-type drive unit of a work vehicle such as a hydraulic excavator or a bulldozer.

BACKGROUND ART

Track-type drive units fire work vehicles such as hydraulic excavators, bulldozers and etc. include an idler tumbler (front idler), a sprocket wheel (driving wheel) and a crawler belt attached and stretched over the idler tumbler and the sprocket wheel in an oval shape (see e.g., Japan Laid-open Patent Application Publication No. JP-A-2003-285781). The travelling actions of the work vehicles are performed by circulation of the crawler belts caused by rotational driving of the sprocket wheels.

The sprocket wheel of the track-type drive unit is configured to be rotated for circulating the crawler belt, while tooth portions thereof are engaged with the crawler belt. Therefore, surface hardening treatment is executed for the tooth portions to be engaged with the crawler belt.

However, the surface hardened layer is worn away in proportion to the cumulative time of the travelling action of the work vehicle. After the surface hardened layer is entirely scraped due to wear, wear of the tooth portions of the sprocket wheel is rapidly progressed and this may cause pitch skipping and etc. Accordingly, troubles may be caused in the work and the travelling action of the work vehicle.

To avoid the situation, it is desirable to replace such a sprocket wheel that lost the surface hardened layer with an unused sprocket wheel. An operator determines whether or not replacement of the sprocket wheel is required based on either his/her visual inspection regarding change in the front shape (tooth profile) of the tooth portions of the sprocket wheel or a result of wear amount (i.e., wear amount) measurement using a wear amount measuring method described in the following procedures (1) and (2).

Explanation of Procedure of Wear Amount Measuring Method

Procedure (1): A transparent film is pressed onto tooth portions of an actual sprocket wheel as a wear amount measurement target, and a line is drawn with a pen such as a permanent marker along the contour of the tooth portions of the actual sprocket wheel seen through the transparent film. Accordingly, the contour shape of the tooth portions of the actual sprocket wheel is transferred onto the film.

Procedure (2): The transparent film to which the tooth portions of the actual sprocket wheel are transferred is put on a design plan of an unused sprocket wheel drawn by the actual scaling. Then, magnitude of an interval between the contour line representing the contour shape of the tooth portions of the sprocket wheel on the design plan and that representing the contour shape of the tooth portions of the sprocket wheel on the transparent film is visually measured with a measuring instrument such as a ruler and the wear amount of the sprocket wheel is calculated based on the measurement.

The latter well-known wear amount measuring method has the following drawbacks.

The work of transferring the tooth portions of the actual sprocket wheel onto the transparent film (Procedure (1)) is bothersome.

The tooth portions of the sprocket wheel have curved shapes. Therefore, accuracy in transference (Procedure (1)) varies because of difference in techniques of operators and etc. it is thus difficult to reliably guarantee certain reliability.

Measurement accuracy is low due to visual measurement with a measuring instrument such as a ruler (Procedure (2)).

Further, decision of replacement timing based on the operator's visual inspection inevitably varies.

A wheel inspection device proposed in Japan Laid-open Patent Application Publication No SP-A-H05-52536 is an exemplary countermeasure for solving the aforementioned drawbacks.

The wheel inspection device of Japan Laid-open Patent Application Publication No. JP-A-H05-52536 is a device for automatically inspecting the wear-related shape change of a flanged wheel rolling on a track and the product life of the wheel. The wheel inspection device includes a first charge-coupled device camera (hereinafter referred to as "a first CCD camera"), a lighting device, a second charge-coupled device camera (hereinafter referred to as "a second CCD camera"), a first image processing device, a second image processing device, a linear encoder and a computer.

The first CCD camera is configured to take an image of the contour of the wheel.

The lighting device is configured to obliquely emit a slit light with respect to a groove cut on the lateral surface of the wheel.

The second CCD camera is configured to take an image of a part illuminated by the lighting device.

The first image processing device is configured to measure the coordinate of the contour of the wheel based on the image taken by the first CCD camera.

The second image processing device is configured to measure the position of the groove cut on the lateral surface of the wheel based on the image taken by the second CCD camera.

The linear encoder is configured to measure the height of the flange of the wheel.

The computer is configured to execute a predetermined computation based on the coordinate data of the contour of the wheel measured by the first image processing device, the position data of the groove cut on the wheel measured by the second image processing device, the measurement data of the flange height of the wheel measured by the linear encoder and etc.

In the wheel inspection device, the outline data of the wheel based on the groove cut on the wheel is obtained through a predetermined computation processing by the computer, and comparison is made between the outline data of the wheel and that of an unused wheel.

According to the wheel inspection device, the wheel is partially abraded when the contour thereof is partially different from that of an unused wheel. It is thereby possible to determine timing when the wheel is disassembled and ground again and etc. Further, it is possible to determine that the product life of the wheel is over and etc. when the flange height based on the groove cut on the wheel is insufficient.

Meanwhile, the wheel inspection device described in Japan Laid-open Patent Application Publication No. JP-A-H05-52536 is configured to measure the shape of the wheel at a single position based on the premise that wear of the wheel is uniformly progressed along the circumferential direction.

On the other hand, in a sprocket wheel embedded in a track-type drive unit for a hydraulic excavator, for instance, wear is differently progressed between the tooth bottom and the tooth tip, and thus, wear of the sprocket wheel is not necessarily uniformly progressed along the circumferential direction.

Therefore, the wheel inspection device described in Japan Laid-open Patent Application Publication No, JP-A-H05-52536 has a drawback that the wear amount cannot be accurately measured when a measurement target of the wear amount is an object that wear is differently progressed from position to position.

It should be noted that a magnification observation device proposed in Japan Laid-open Patent Application Publication No, JP-A-2007-318555 or an imaging device proposed in Japan Laid-open Patent Application Publication No. JP-A-2008-2244K for instance, may be assumed to be applied to comparison between the outline data of an actual wheel and that of an unused wheel. However, these devices cannot directly measure the wear amount.

SUMMARY

The present invention has been produced in view of the aforementioned drawbacks. It is an object of the present invention to provide a wear amount measuring device, a wear amount measuring method, a wear amount measuring program and a storage medium whereby the wear amount can be accurately measured even in measuring the wear amount of a measurement target that progression of wear varies from position to position.

To achieve the aforementioned object, a wear amount measuring device according to a first aspect of the present invention includes an image display unit, an image processing unit and a wear amount computing unit. The image display unit is configured to: display a real object image based on real object image data containing a wear amount measurement target and a reference part thereof functioning as a measurement-related positioning reference for the wear amount measurement target; and display a plan image based on design plan data containing the wear amount measurement target and the reference part thereof. The image processing unit is configured to execute an image processing of overlapping the real object image and the plan image at an equal scale on a corresponding positional relation when the reference part in the real object image and the reference part in the plan image are matched. The wear amount computing unit is configured to compute a wear amount based on a magnitude of an interval between a measurement contour line drawn along a contour of the wear amount measurement target in the real object image and a plan contour line in the plan image.

In the wear amount measuring device of the first aspect of the present invention, the wear amount measurement target is preferably a sprocket wheel having a plurality of tooth portions on an outer periphery thereof and the reference part is preferably at least two bolts for securing the sprocket wheel to a sprocket hub as an attachment target of the sprocket wheel (a second aspect of the present invention).

Further, in the wear amount measuring device of the first aspect of the present invention, the wear amount measurement target is preferably a sprocket wheel having a plurality of tooth portions on an outer periphery thereof, and the reference part is preferably two bolts for securing the sprocket wheel to a sprocket hub as an attachment target of the sprocket wheel and tooth tips of the sprocket wheel (a third aspect of the present invention).

A wear amount measuring method according to a fourth aspect of the present invention includes an image displaying step, an image processing step and a wear amount computing step. The image displaying step is a step of: displaying a real object image based on real object image data containing a wear amount measurement target and a reference part thereof functioning as a measurement-related positioning reference for the wear amount measurement target; and displaying a plan image based on design plan data containing the wear amount measurement target and the reference part thereof. The image processing step is a step of executing an image processing of overlapping the real object image and the plan image at an equal scale on a corresponding positional relation when the reference part in the real object image and the reference part in the plan image are matched. The wear amount computing step is a step of computing a wear amount based on a magnitude of an interval between a measurement contour line drawn along a contour of the wear amount measurement target in the real object image and a plan contour line in the plan image.

In the wear amount measuring method of the fourth aspect of the present invention, the reference part is preferably two reference points that are separated away from each other and are visible in a usage state of the wear amount measurement target (a filth aspect of the present invention).

A wear amount measuring program according to a seventh aspect of the present invention is configured to cause a computer to execute a wear amount measuring method. The wear amount measuring method includes the following steps. The steps include a step of displaying a real object image based on real object image data containing a wear amount measurement target and a reference part thereof including two reference points and functioning as a measurement-related positioning reference for the wear amount measurement target; and displaying a plan image based on design plan data containing the wear amount measurement target and the reference part thereof including two reference points. Further, the steps include a step of executing an image processing of overlapping the real object image and the plan image at an equal scale on a corresponding positional relation when the reference part in the real object image and the reference part in the plan image are matched. Yet further, the steps include a step of computing a wear amount based on a magnitude of an interval between a measurement contour line drawn along a contour of the wear amount measurement target in the real object image and a plan contour line in the plan image.

A storage medium according to a ninth aspect of the present invention is a computer readable storage medium stored with a wear amount measuring program configured to cause a computer to execute a wear amount measuring method. The wear amount measuring method includes an image displaying step, an image processing step and a wear amount computing step. The image displaying step is a step of displaying a real object image based on real object image data containing a wear amount measurement target and a reference part thereof including a plurality of reference points and functioning as a measurement-related positioning reference for the wear amount measurement target; and displaying a plan image based on design plan data containing the wear amount measurement target and the reference part thereof including the plural reference points. The image processing step is a step of executing an image processing of overlapping the real object image and the plan image at an equal scale on a corresponding positional relation when the reference part in the real object image and the reference part in the plan image are matched. The wear amount computing step is a step of computing a wear amount based on a magnitude of an interval between a measurement contour line drawn along a contour of the wear amount measurement target in the real object image and a plan contour line in the plan image.

In the present invention, the real object image and the plan image are overlapped at an equal scale while the reference parts thereof are matched. Accordingly, it is possible to accurately compare the wear amount measurement target in the real object image and that in the plan image. Further, the wear amount is computed based on the magnitude of the interval between the measurement contour line drawn along the contour of the wear amount measurement target in the real object image and the plan contour line in the plan image. Accordingly, it is possible to accurately compute how much and which part of the wear amount measurement target is worn away. Therefore, the wear amount can be accurately measured even in measuring the wear amount of a measurement target that progression of wear varies from position to position.

DESCRIPTION OF THE EMBODIMENTS

A wear amount measuring device, a wear amount measuring method, a wear amount measuring program and a storage medium according to an exemplary embodiment of the present invention will be hereinafter explained with reference to the drawings.

It should be noted that the present exemplary embodiment is explained with an exemplary case of applying the present invention to a wear amount measuring device intended for a sprocket wheel, as a wear amount measurement target, embedded in a track-type drive unit of a hydraulic excavator as a work vehicle. However, the application target of the present invention is not limited to the above. The present invention can be applied to a wear amount measuring device intended for the other expendable part as a wear amount measurement target.

Schematic Explanation of Track-Type Drive Unit 1 of Hydraulic Excavator

Figure 1:
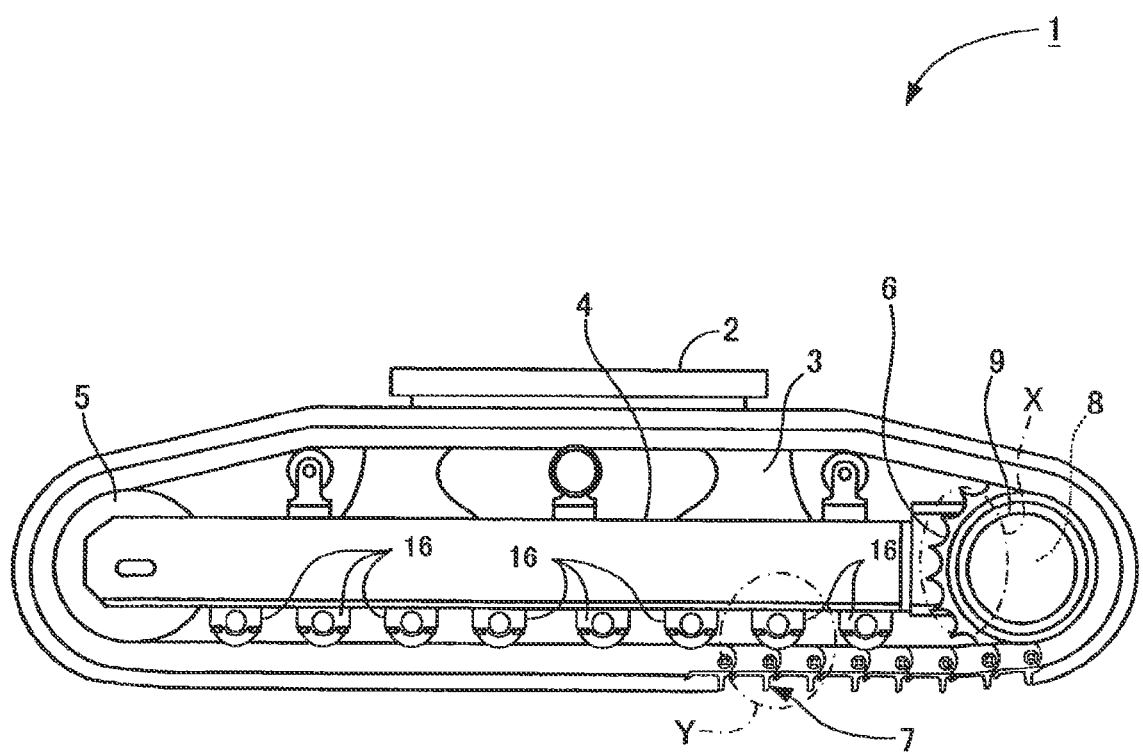
FIG. 1 is a side view of a track-type drive unit of a hydraulic excavator, which is equipped with sprocket wheels that the wear amount thereof is measured by a wear amount measuring device according to an exemplary embodiment of the present invention.

A track-type drive unit 1 illustrated in FIG. 1 includes a pair of track frames 4 (only left-side one is illustrated) respectively extended on the both sides of a center frame 3 in the back-and-forth direction. The center frame 3 herein includes an attachment base 2 for attaching thereto a revolving bearing (not illustrated in the figures) an upper structure (not illustrated in the figure) in a revolvable state.

An idler tumbler (front idler) 5 is disposed on the front end of each track frame 4. On the other hand, a sprocket wheel (driving wheel) 6 is disposed on the rear end of each track frame 4. Further, a crawler belt 7 is wound around the idler tumbler 5 and the sprocket wheel 6 in an oval shape.

Figure 2:
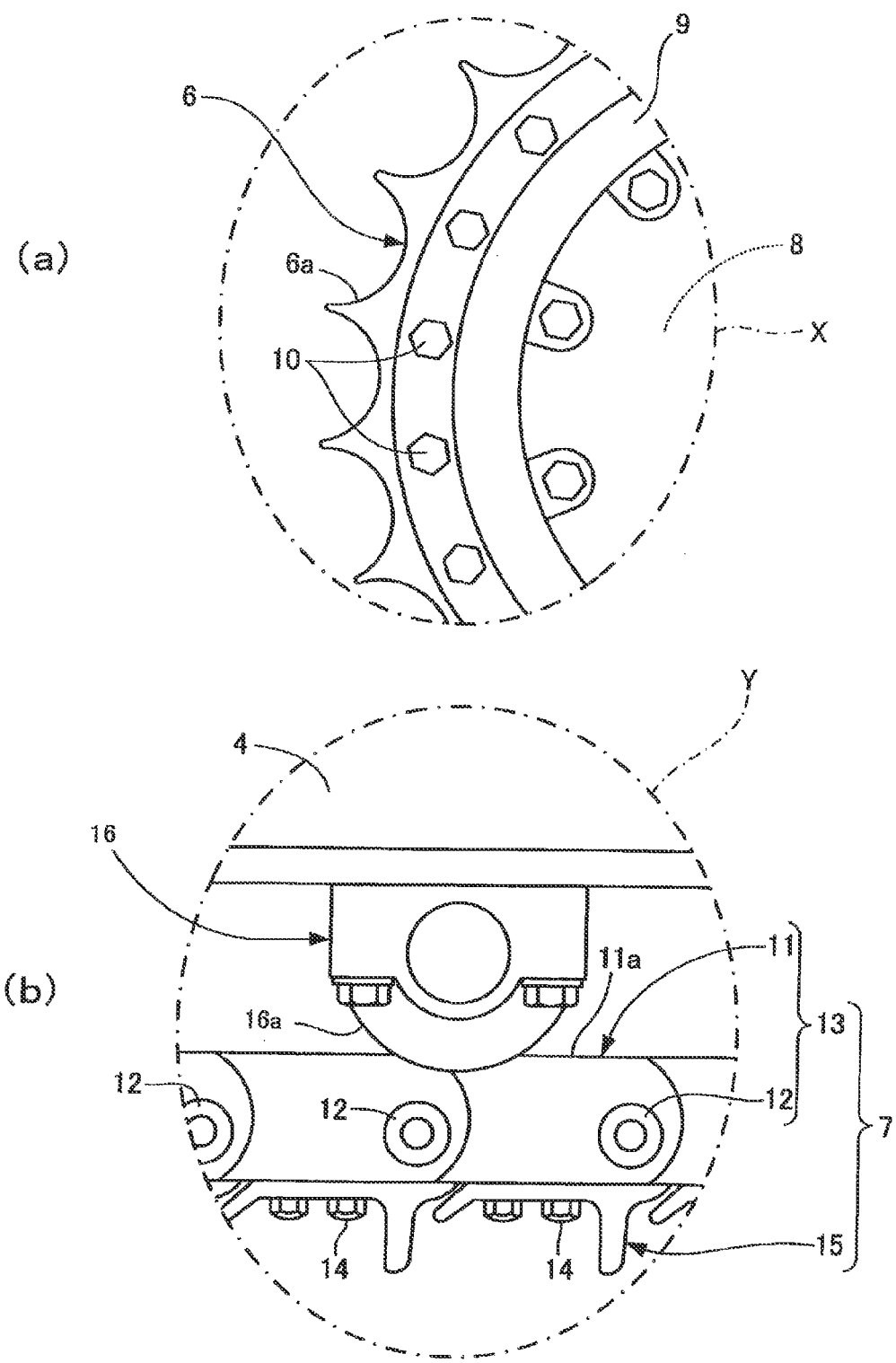
FIG. 2 includes an enlarged view (a) of an area X in FIG. 1 and an enlarged view (b) of an area Y in FIG. 1.

As illustrated in FIG. 2(a), the sprocket wheel 6 is secured to a sprocket hub 9 by means of bolts 10. The sprocket hub 9 is driven and rotated by a hydraulic motor 8 tier travelling. The sprocket wheel 6 and the plural bolts 10 are partially visible from the outside. The sprocket wheel 6 includes a plurality of tooth portions 6a to be engaged with the crawler belt 7 on the outer periphery thereof. The crawler belt 7 is circulated by means of rotation of the sprocket wheel 6 and this causes the hydraulic excavator to travel. Therefore, surface hardening treatment is executed for the tooth portions 6a to be engaged with the crawler belt 7.

As illustrated in FIG. 2(b), each crawler belt 7 is mainly formed by a track link 13 and a plurality of shoe plates 15. The track link 13 is formed by endlessly coupling a required number of link assemblies 11, each of which is formed by a pair of right and left links, through a plurality of crawler belt pins 12. Each shoe plate 15 is secured to the ground engaging side of each link assembly 11 by means of bolts 14. Each link assembly 11 includes a roller contact surface (tread surface 11a) on the non-ground engaging side thereof. The tread surfaces 11a make contact with rollers 16a of a required number of lower roller devices 16. The lower roller devices 16 are attached to the bottom face of each track frame 4 in order to transfer the vehicle weight to each crawler belt 7 in a disperse manner. The tread surfaces 11a are visible from the outside when not making contact with the lower roller devices 16.

Next, a wear amount measuring device 20 for measuring the wear amount of the sprocket wheel 6 will be explained.

Schematic Explanation of Wear Amount Measuring Device 20

Figure 3:
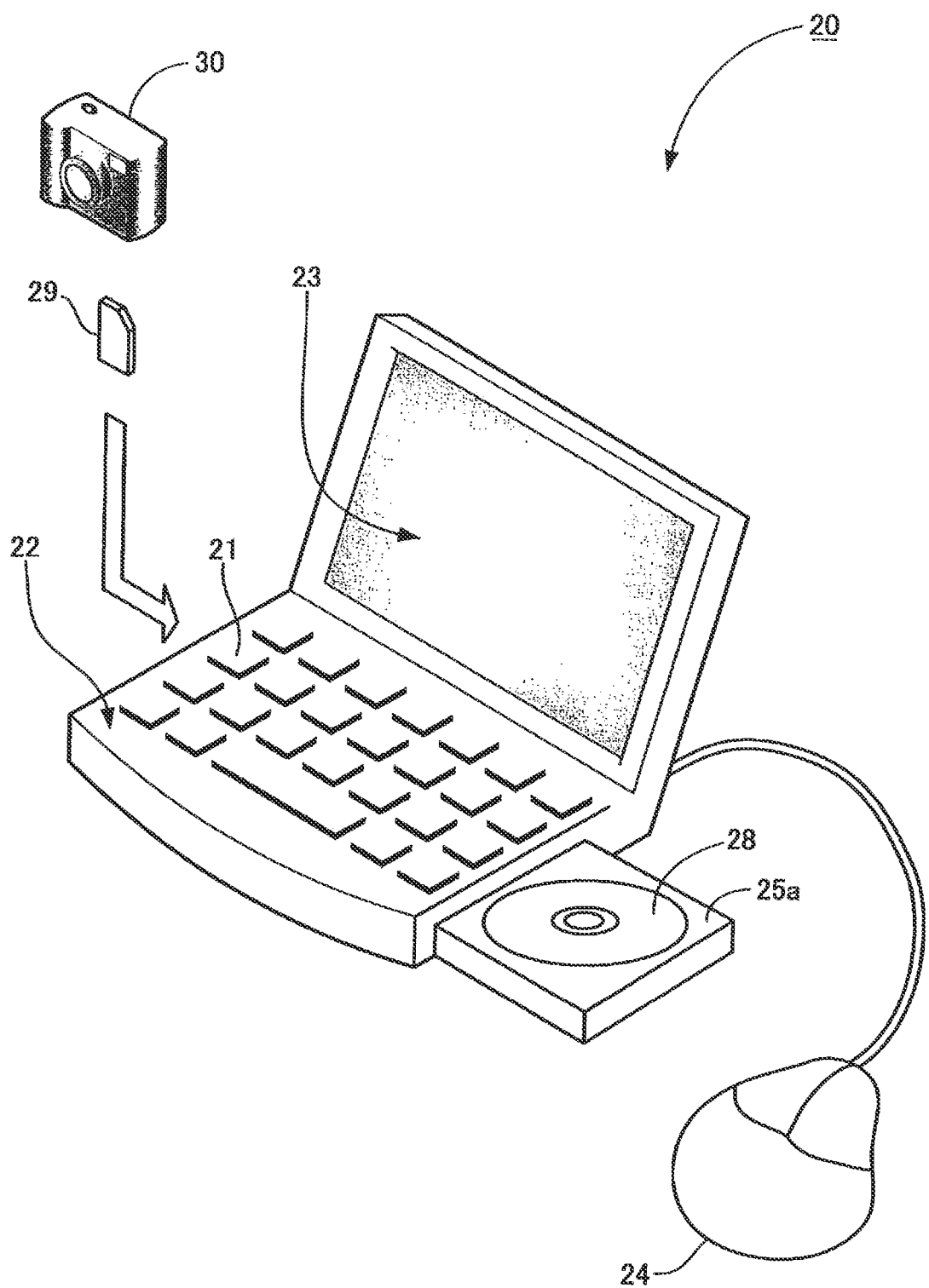
FIG. 3 is an entire external perspective view of the wear amount measuring device according to the exemplary embodiment of the present invention.

As illustrated in FIG. 3, the wear amount measuring device 20 includes a measuring device main body 22, a display device (DISPLAY) 23 and a mouse (MOUSE) 24. The measuring device main body 22 includes a required number of operating keys (KEY) 21 for inputting characters and etc. The display device 23 is a liquid crystal display or the like. The mouse 24 serves to operate a mouse pointer or the like displayed on the screen of the display device 23.

Schematic Explanation of Measuring Device Main Body 22

Figure 4:
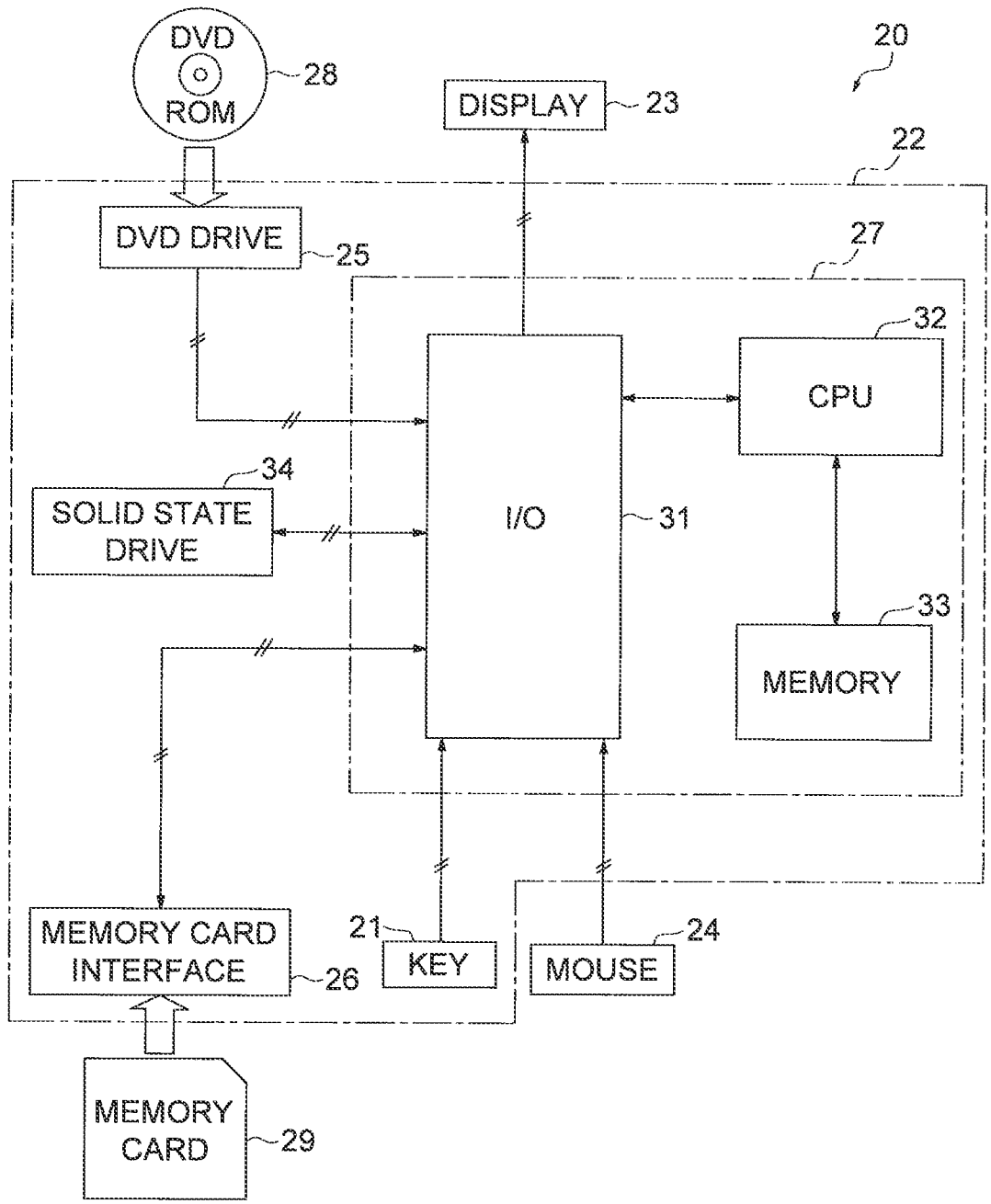
FIG. 4 is a schematic system configuration diagram of the wear amount measuring device of the present exemplary embodiment.

As illustrated in FIG. 4, a DVD drive (DVD DRIVE) 25, a memory card interface (MEMORY CARD INTERFACE) 26, an arithmetic circuit 27 and a storage device drive (SOLID STATE DRIVE) 34 are embedded in the inside of the measuring device main body 22.

Explanation of DVD Drive 25

The DVD time 25 includes a tray 25a (see FIG. 3) for inserting a DVD-ROM 28 in the inside thereof. The DVD drive 25 is configured to read out data stored in the DVD-ROM 28 inserted therein through the tray 25a.

In the present exemplary embodiment, the DVD-ROM 28 stores design plan data, a predetermined wear amount measuring program and etc.

Explanation of Memory Card Interface 26

The memory card interface 26 includes a slot (not illustrated in the figures) that a memory card 29 is inserted. The memory card interface 26 is configured to intervene data transference between the memory card 29 inserted into the slot and the arithmetic circuit 27.

Digital data of an image pictured by a digital camera 30 (see FIG. 3) is herein recorded in the memory card 29 (the digital data will be hereinafter simply referred to as "real object image data"). The image contains the sprocket wheel 6 and the bolts 10 (reference part). The sprocket wheel 6 and the bolts 10 as photographic objects are exposed to the outside. Therefore, it is possible to take a picture of a state that the sprocket wheel 6 is attached to the work vehicle (a service state).

Explanation of Hardware Configuration of Arithmetic Circuit 27

The arithmetic circuit 27 is mainly formed by an I/O circuit 31, a CPU (Central Processing Unit) 32 and a memory 33.

The I/O circuit 31 has a function of processing transmission and receipt of signals between the CPU 32 and the peripheral devices and etc.

The CPU 32 is configured to execute processing such as computation based on a predetermined wear amount measuring program stored in the storage device drive 34.

The memory 33 is a cache memory formed by storage elements (e.g., a read/write RAM, a read-only ROM and etc.) and etc. Further, the memory 33 is configured to store data and etc. required to be temporarily stored in a computation process.

Explanation of Storage Device Drive 34

The storage device drive 34 is an external storage device using a semiconductor storage element and is referred to as a flash memory drive.

Explanation of Storage Content of Storage Device Drive 34

The storage device drive 34 is configured to store the real object image data read out of the memory card 29 through the memory card interface 26.

Further, the storage device drive 34 is configured to store the predetermined wear amount measuring program and the design plan data read out of the DVD-ROM 28 through the DVD drive 25. The design plan data is herein stored in association with vehicle model numbers on a work vehicle model basis and includes: (1) a Cartesian coordinate map representing a dimension of the shape (curve profile) of the tooth portions 6a in manufacturing the sprocket wheel 6; (2) a positional coordinate map of a reference circle center point (rotational center point) of the sprocket wheel 6 in the Cartesian coordinate system; (3) a positional coordinate (reference point) map of the center points of the bolts 10 in the Cartesian coordinate system when the sprocket wheel 6 is secured to the sprocket hub 9 by means of the bolts 10; and (4) a positional coordinate map of the apices of the respective corner portions of the hexagonal head of each bolt 10.

Figure 6:
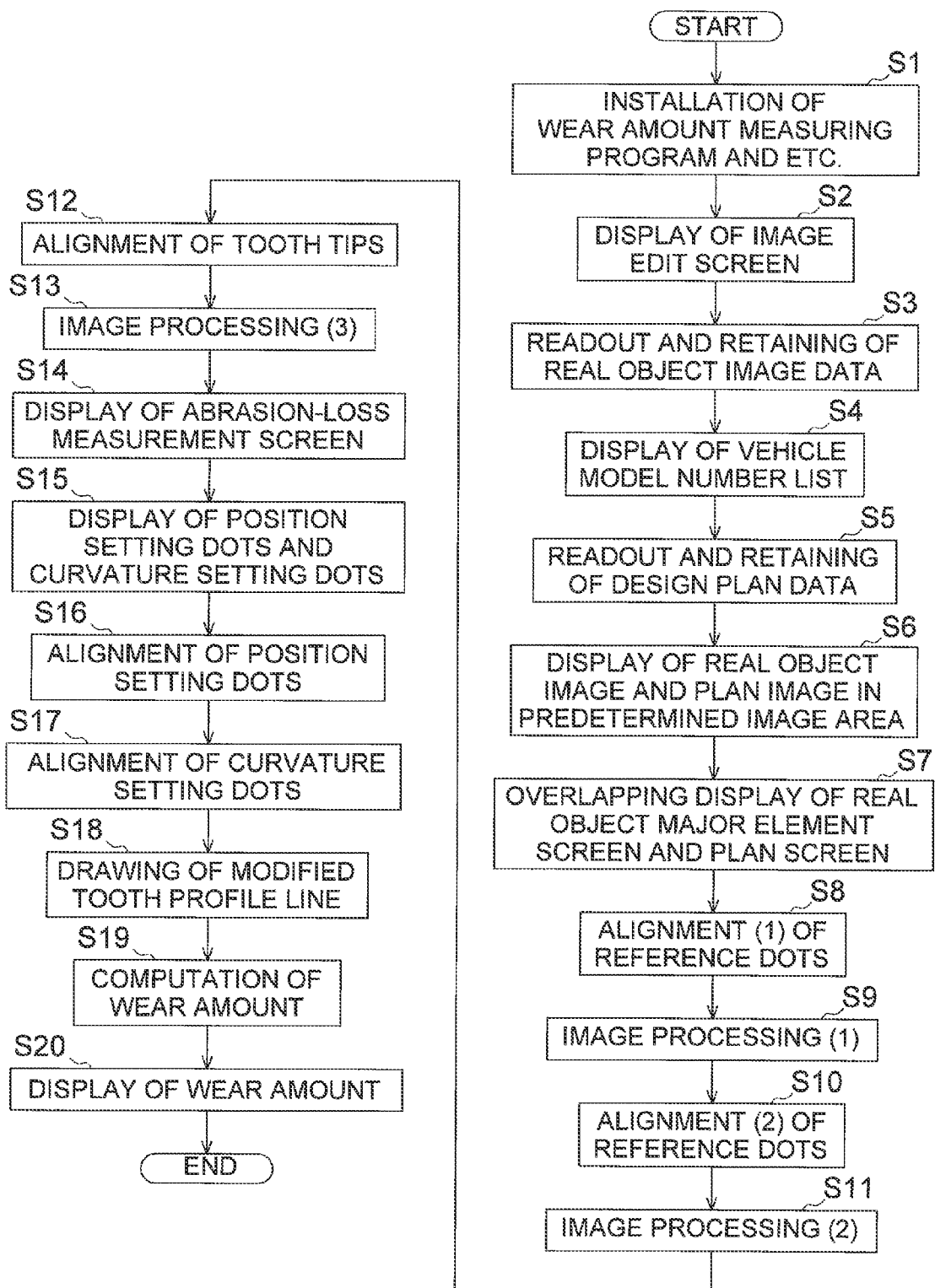
FIG. 6 is a flowchart for explaining a wear amount measuring program.

Further, the programs stored in the storage device drive 34 include the wear amount measuring program created based on an algorithm represented in a flowchart of FIG. 6.

Explanation of Function of Arithmetic Circuit 27

Figure 5:
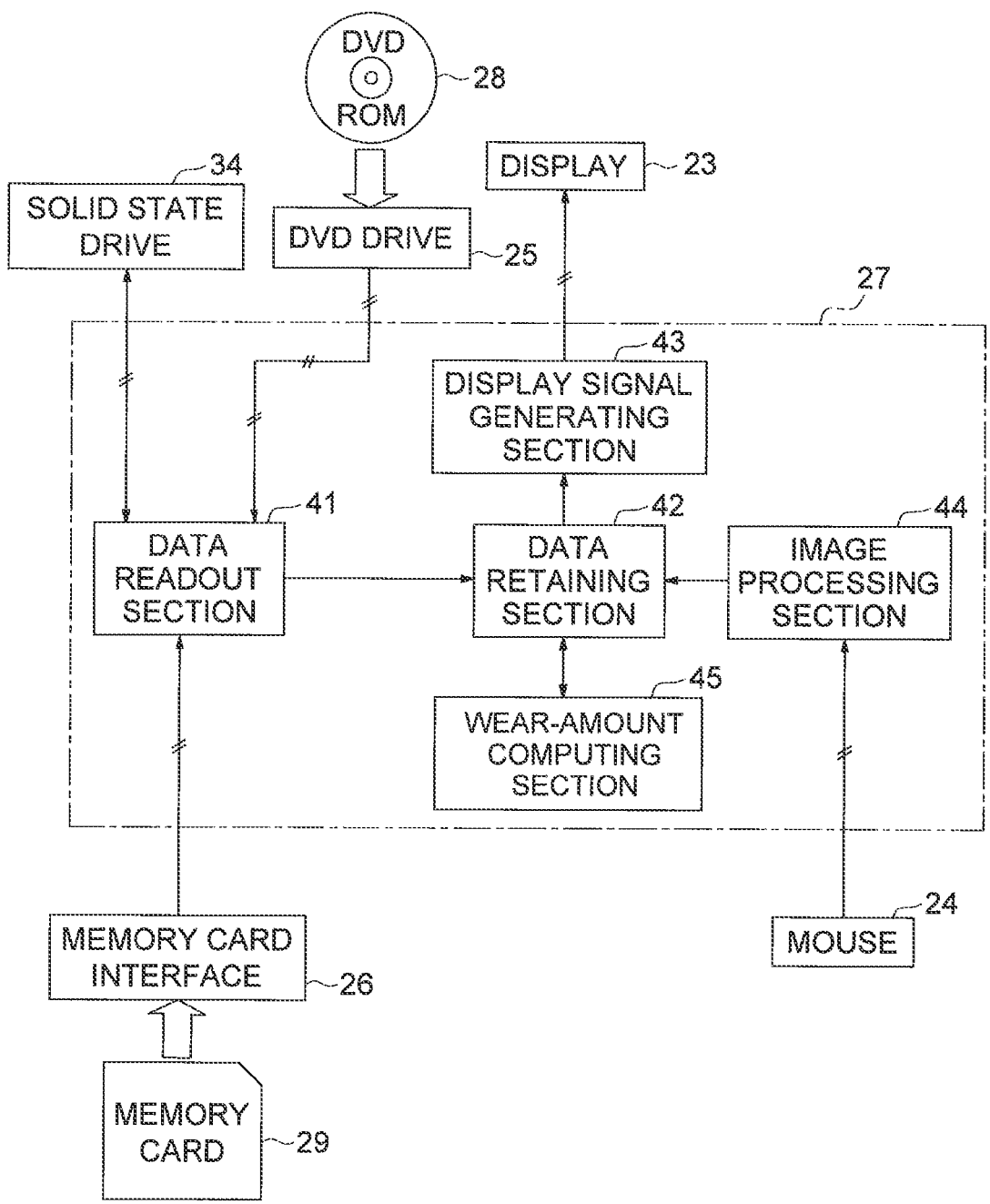
FIG. 5 is a functional block diagram of an arithmetic circuit.

As illustrated in FIG. 5, the arithmetic circuit 27 includes a variety of functional sections that functions thereof are implemented when the CPU 32 executes the wear amount measuring program stored in the storage device drive 34. Specifically, the arithmetic circuit 27 includes a data readout section 41, a data retaining section 42, a display signal generating section 43, an image processing section 44 and a wear amount computing section 45.

The data readout section 41 is configured to read out required data respectively from the storage device drive 34, the DVD-ROM 28 through the DVD drive 25, and the memory card 29 through the memory card interface 26, respectively.

The data retaining section 42 is configured to retain the required data in a processable (e.g., manipulatable) state during execution of the wear amount measuring program. It should be noted that the data retaining section 42 corresponds to the memory 33 in FIG. 4.

The display signal generating section 43 is configured to generate a predetermined display signal based on the data retained in the data retaining section 42.

The image processing section 44 is configured to manipulate the image related data retained in the data retaining section 42.

The wear amount computing section 45 is configured to compute the wear amount of the tooth portions 6a of the sprocket wheel 6 based on the data retained in the data retaining section 42.

Explanation of Procedure of Wear Amount Measuring Method

Next, a specific procedure of implementing a wear amount measuring method using the wear amount measuring device 20 of the present exemplary embodiment will be hereinafter explained with reference to a functional block diagram of the arithmetic circuit in FIG. 5, a flowchart in FIG. 6 and diagrams for explaining the procedure of measuring the wear amount of the sprocket wheel in FIGS. 7 to 12.

Installation Step for Wear Amount Measuring Program and so Forth

Explanation of Processing Content of Step S1

First, the DVD drive 25 is configured to be activated when the DVD-ROM 28 is put on the tray 25a of the DVD drive 25 and is inserted into the DVD drive 25.

The data readout section 41 is herein configured to read out the wear amount measuring program, the design plan data and etc. recorded in the DVD-ROM 28 through the DVD drive 25 and send the read-out wear amount measuring program, design plan data and etc. to the storage device drive 34. The storage device drive 34 is configured to retain the wear amount measuring program, the design plan data and etc. sent thereto from the data readout section 41 in a program executable state.

Image Edit Screen Display Step

Explanation of Processing Content of Step S2

Next, the CPU 32 is configured to execute the wear amount measuring program stored in the storage device drive 34 through the data readout section 41. Specifically, the display signal generating section 43 is firstly configured to generate a display signal for causing the display device 23 to display an image edit screen 50 illustrated in FIG. 7(*a*) and send the generated display signal to the display device 23. In response, the display device 23 is configured to display the image edit screen 50 illustrated in FIG. 7(*a*).

Explanation of Display Contents of Respective Screen Areas of image Edit Screen 50

Figure 7:
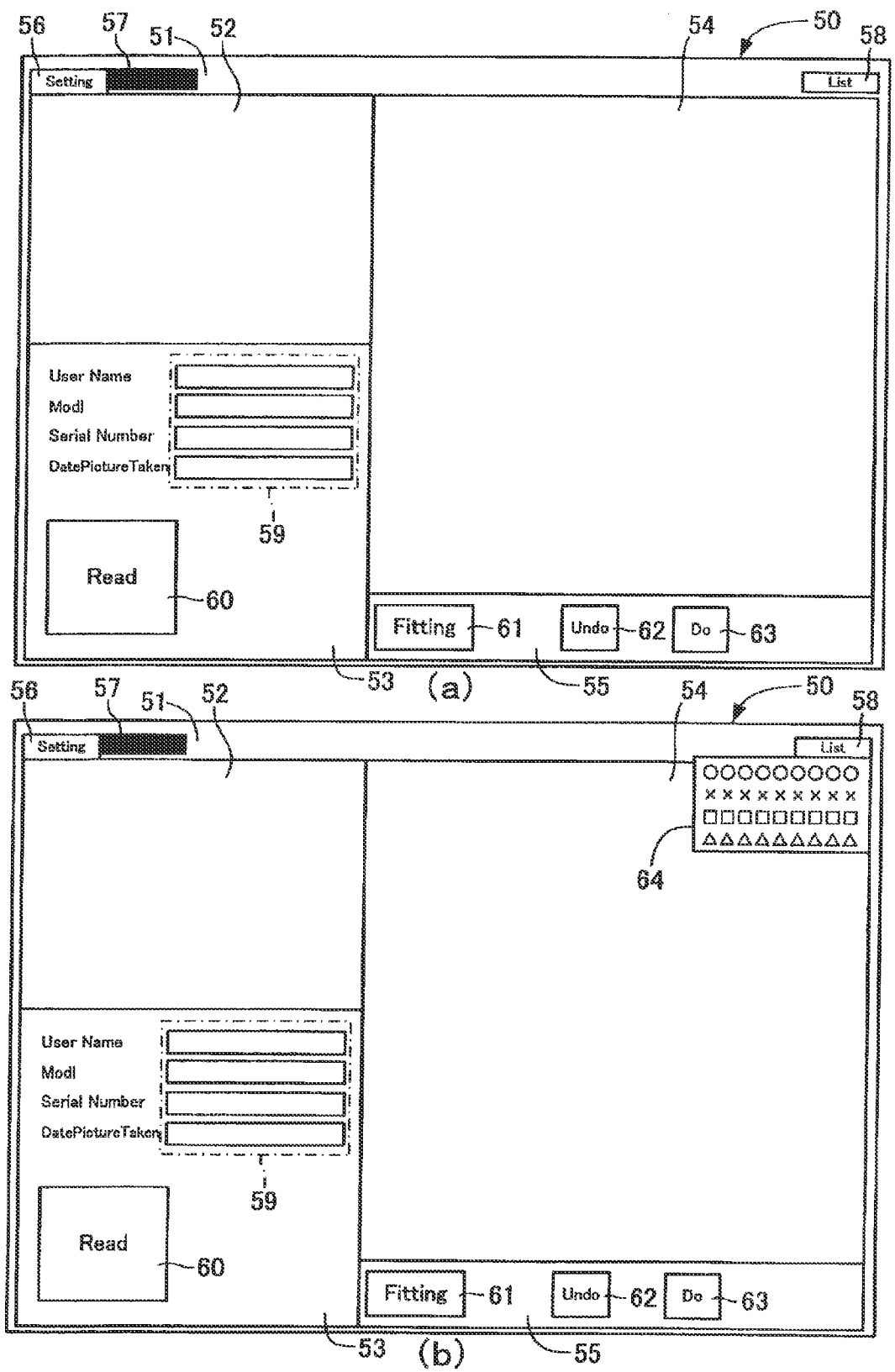
FIG. 7 is a diagram (1) for explaining a wear amount measuring procedure of a sprocket wheel.

The image edit screen 50 illustrated in FIG. 7(*a*) is a screen for editing an image in an image edit mode and includes a first screen area 51, a second screen area 52, a third screen area 53, a fourth screen area 54 and a fifth screen area 55.

An image edit mode button 56, a wear amount measurement mode button 57, a vehicle model number list button 58 and etc. are displayed in the first screen area 51.

The entirety of a real object image is displayed in the second screen area 52 based on the real object image data loaded from the memory card 29.

A basic input item entry field 59, an image data readout start button 60 and etc. are displayed in the third screen area 53. The basic input item entry field 59 is a field for filling in basic input items such as a user name, a vehicle model number, a serial number and a date when the real object image data was retrieved.

A composite image is displayed in the fourth screen area 54. The composite image is created by overlapping and synthesizing a plan image based on the design plan data and a real object major element image obtained by copy-and-pasting a specified area of the real object image displayed in the second screen area 52 in different layers.

A fitting button 61, an undo button 62, a redo button 63 and etc. are displayed in the fifth screen area 55.

Real Object Image Data Readout and Retaining Step

Explanation of Processing Content of Step S3

When the image data readout start button 60 is clicked through an operation of the mouse 24, the data readout section 41 is configured to read out the real object image data stored in the memory card 29 through the memory card interface 26 and send the readout data to the storage device drive 34 and the data retaining section 42. The data retaining section 42 is configured to retain the real object image data sent thereto from the data readout section 41 in a processable (e.g., manipulatable) state. The storage device drive 34 is configured to store the real object image data sent thereto.

Vehicle Model Number List Display Step

Explanation of Processing Content of Step S4

When the vehicle model number list button 58 is clicked through an operation of the mouse 24, the data readout section 41 is configured to read out the vehicle model number list data from the storage device drive 34 and send the readout data to the data retaining section 42. The data retaining section 42 is configured to retain the vehicle model number list data sent thereto from the data readout section 41.

The display signal generating section 43 is configured to generate a display signal for displaying the vehicle model number list data retained by the data retaining section 42 in a pull-down menu 64 as illustrated in FIG. 7(*b*) and send the generated display signal to the display device 23. Accordingly, the vehicle model number list is displayed in the pull-down menu 64 illustrated in FIG. 7(*b*).

Design Plan Data Readout and Retaining Step

Explanation of Processing Content of Step S5

Figure 8:
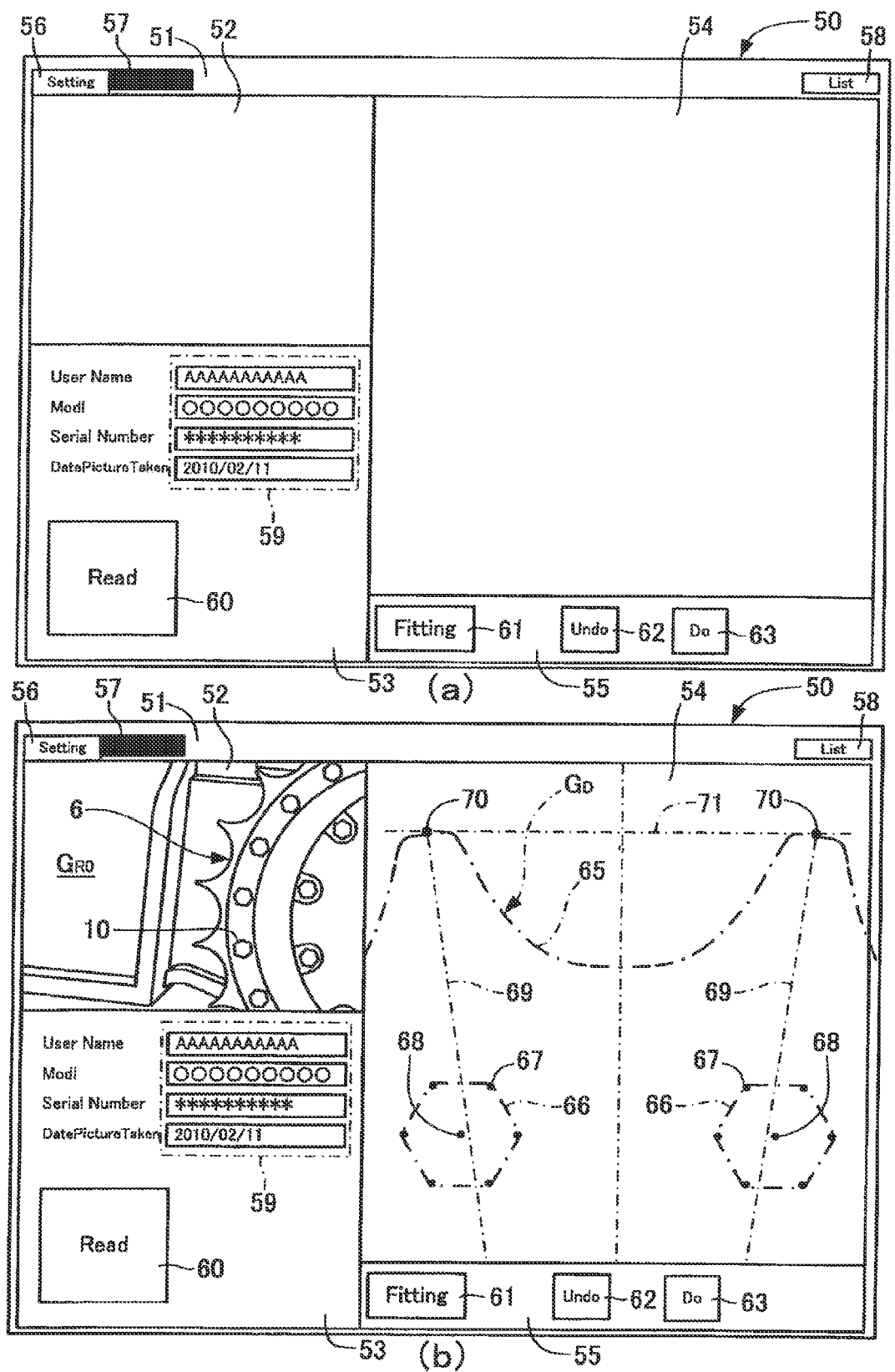
FIG. 8 is a diagram (2) for explaining the wear amount measuring procedure of the sprocket wheel.
Figure 9:
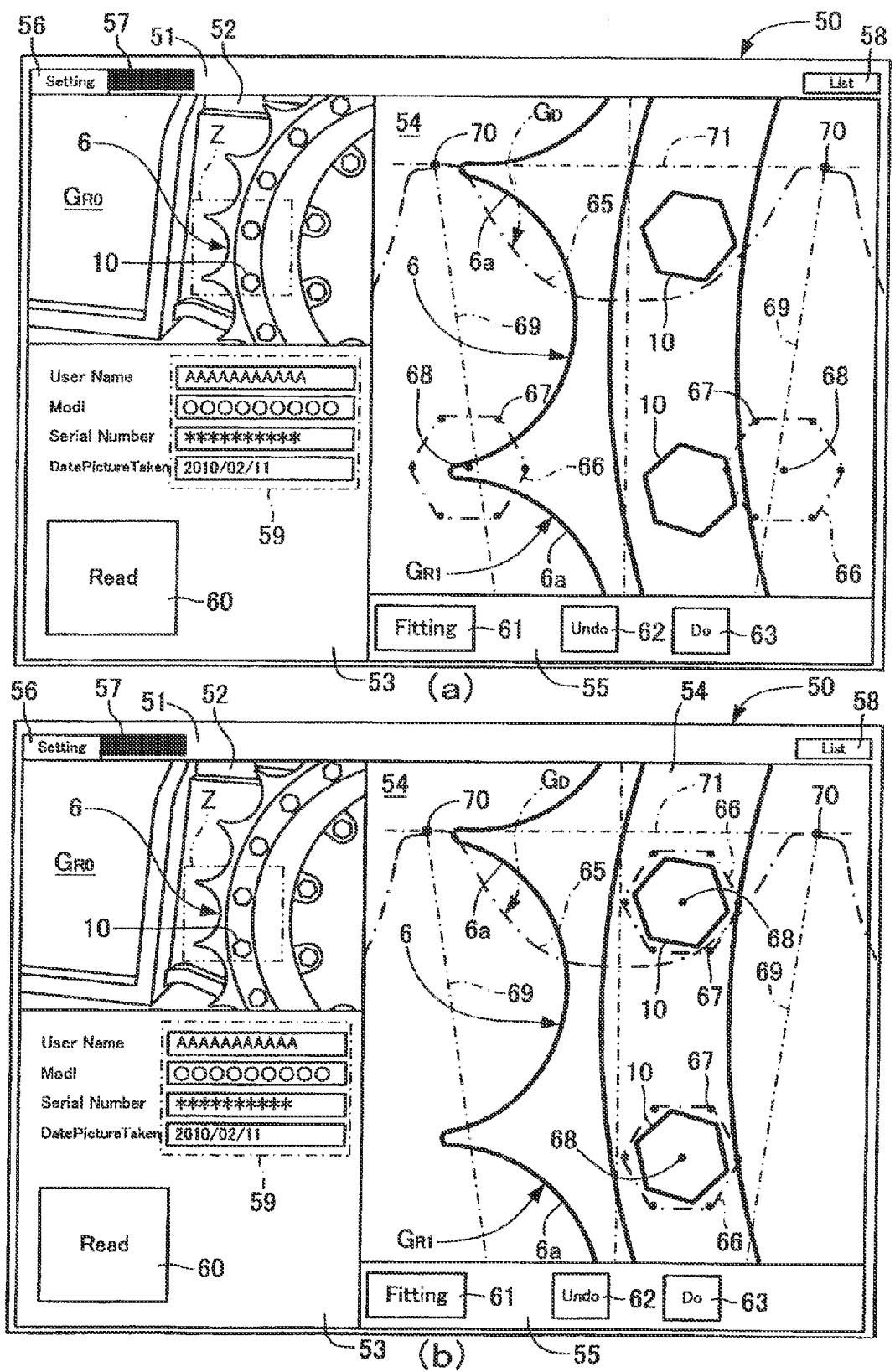
FIG. 9 is a diagram (3) for explaining the wear amount measuring procedure of the sprocket wheel.

When a vehicle model number, corresponding to the real object image data, is selected and clicked from the vehicle model number list displayed in the pull-down menu 64 through an operation of the mouse 24, the data readout section 41 is configured to read out the design plan data corresponding to the selected vehicle model number from the storage device drive 34 and send the readout data to the data retaining section 42. The data retaining section 42 is configured to retain the design plan data sent thereto from the data readout section 41 in a processable (e.g., manipulatable) state. As illustrated in FIG. 8(*a*), the selected vehicle model number is herein configured to be automatically inputted into a vehicle model number entry subfield contained in the basic input item entry field 59 of the third screen area 53.

Image Display Step

Explanation of Processing Content of Step S6

The display signal generating section 43 is configured to generate a display signal for displaying in the second screen area 52 a real object image $G_{RO}$ produced based on the real object image data retained by the data retaining section 42 as illustrated in FIG. 8(*b*) and send the generated display signal to the display device 23. Accordingly, the real object image $G_{RO}$ based on the real object image data is displayed in the second screen area 52 as illustrated in FIG. 8(*b*).

The display signal generating section 43 is configured to generate a display signal for displaying in the fourth screen area 54 a plan image $G_D$ produced based on the design plan data retained by the data retaining section 42 as illustrated in FIG. 8(*b*) and send the generated display signal to the display device 23. Accordingly, the plan image $G_D$ based on the design plan data is displayed in the form of lines in the fourth screen area 54 as illustrated in FIG. 8(*b*).

It should be noted that a slid line is configured to be used as a line type for drawing the plan image $G_D$ in an actual situation. However, a dotted line is herein used as the line type for drawing the plan image $G_D$ for the sake of explanation.

Explanation of Display Content of Plan Image

The plan image $G_D$ displayed in the fourth screen area 54 is mainly drawn by a reference tooth profile line 65, reference bolt lines 66, bolt dots 67, reference dots 68, reference tooth tip lines 69, tooth tip dots 70 and a tooth tip connection line 71.

The reference tooth profile line 65 represents the contours of two adjacent tooth portions 6*a*.

The reference bolt lines 66 represent the contours of the hexagonal heads of two bolts 10 disposed correspondingly to two tooth portions 6a disposed adjacently to each other.

The bolt dots 67 represent the respective apices of the hexagonal reference bolt lines 66. Each bolt dot 67 is depicted with a dot having a diameter slightly greater than the line width of the reference bolt line 66.

The reference dots 68 represent the centers of the bolts 10. Each reference dot 68, disposed in the center position of each hexagonal reference bolt line 66, is depicted with a dot having the same diameter as each bolt bot 67.

Each reference tooth tip line 69 is a line connecting the center of a reference circle for the tooth portions 6a of the sprocket wheel 6 (i.e., the rotational center of the sprocket wheel 6) and the center point of the tip of each tooth 6a (tooth tip).

Each tooth tip dot 70, representing the center point of the tooth tip, is depicted with a dot having the same diameter as each bolt dot 67.

The tooth tip connection line 71 is a line connecting two tooth tip dots 70 disposed adjacently to each other.

A user is allowed to move the displayed lines on the fourth screen area 54 by dragging the dots 67, 68 and 70 through an operation of the mouse 24.

Overlapped Image Display Step

Explanation of Processing Content of Step S7

An area Z (see FIG. 9(a)), specified in the real object image $G_{R0}$ displayed in the second screen area 52, is copied and pasted as a real object major element image $G_{R1}$ on the fourth screen area 54 through an operation of the mouse 24. The image processing section 44 is herein configured to extract real object major element image data, corresponding to the real object major element image $G_{R1}$, from the real object image data retained in the data retaining section 42 and send the extracted data to the data retaining section 42. The data retaining section 42 is configured to retain the real object major element image data sent thereto from the image processing section 44 in a processable (e.g., manipulatable) state.

The display signal generating section 43 is configured to generate a display signal for displaying, in the fourth screen area 54 as illustrated in FIG. 9(a), the real object major element image $G_{R1}$ based on the real object major element image data retained in the data retaining section 42 and send the generated display signal to the display device 23. Accordingly, a composite image, obtained by overlapping the real object major element image $G_{R1}$ based on the real object major element image data with the plan image $G_D$, is displayed in the fourth screen area 54 as illustrated in FIG. 9(a). It should be noted that the position of the real object major element image $G_{R1}$ and that of the plan image GD has not been associated yet in the composite image. Further, the real object major element image $G_{R1}$ and the plan image $G_D$ are set as different image layers in the composite image. Therefore image processing can be separately executed for the real object major element image $G_{R1}$ and the plan image $G_D$.

Explanation of Display Content of Real Object Major Element Image $G_{R1}$

It is herein required to display, as the real object major element $G_{R1}$, an area including two tooth portions 6a adjacent to each other in the sprocket wheel 6 and the heads of two bolts 10 for fixation corresponding to the tooth portions 6a. Therefore, it is required in the processing of Step S7 to specify and copy the area Z (see FIG. 9(a)) including two tooth portions 6a adjacent to each other in the sprocket wheel 6 and the heads of two bolts 10 for fixation corresponding to the tooth portions 6a in the real object image $G_{R0}$ displayed in the second screen area 52 through an operation of the mouse 24.

Aligning Step (1) of Reference Dots 68

Explanation of Processing Content of Step S8

In the fourth screen area 54, two reference dots 68 in the plan image $G_D$ are respectively moved to the vicinity of the center points of the heads of two adjacent bolts 10 in the real object major element image $G_{R1}$ through an operation of the mouse 24. Specifically, a mouse pointer, configured to be moved in conjunction with an operation of the mouse 24, is displayed on the fourth screen area 54. Using the mouse pointer, the reference dots 68 are dragged onto the heads of the bolts 10 in the real object major element image $G_{R1}$. Accordingly, the image processing section 44 is configured to manipulate the design plan data related to the reference dots 68, the reference bolt lines 66 and the bolt dots 67, retained by the data retaining section 42, so that the reference bolt lines 66 and the bolt dots 67 can be respectively moved together with the reference dots 68 in conjunction with an operation of the mouse 24. The design plan data before manipulation i.e., before movement of the reference dots 68), related to the reference dots 68, the reference bolt lines 66 and the bolt dots 67, is configured to be separately retained in the data retaining section 42 without being displayed as an image.

The display signal generating section 43 is configured to generate a display signal for displaying the plan image $G_D$ based on the design plan data to be manipulated by the image processing section 44 in the fourth screen area 54 and send the display signal to the display device 23. Accordingly, two reference dots 68 in the plan image $G_D$ are respectively moved to the vicinity of the center points of the heads of two adjacent bolts 10 in the real object major element image $G_{R1}$ as illustrated in FIG. 9(b). Simultaneously with this, two reference bolt lines 66 in the plan image are respectively moved to the vicinity of the heads of two adjacent bolts 10 in the real object major element image $G_{R1}$ and the bolt bots 67 a real so moved to follow the respective reference bolt lines 66. Only the reference dots 68, the reference bolt lines 66 and the bolt dots 67 are herein moved through an operation of the mouse 24, while none of the reference tooth profile line 65, the reference tooth tip lines 69, the tooth tip dots 70 and the tooth tip connection line 71 are moved through an operation of the mouse 24.

Image Processing Step (1)

Explanation of Processing Content of Step S9

When the fitting button 62 is pressed after movement of two reference dots 68 is completed in the aligning step (1) of the reference dots 68, the image processing section 44 is configured to calculate displacement amounts between the position and the size of the sprocket wheel 6 displayed in the plan image $G_D$ and those of the sprocket wheel 6 displayed in the real object major element image $G_{R1}$ based on positional displacement between pre- and post-movement of two reference dots 68 in the fourth screen area 54. Based on the displacement amounts, a conversion coefficient is then calculated for converting the position and the size of the sprocket wheel 6 displayed in the real object major element image $G_{R1}$ into those of the sprocket wheel 6 in the plan image $G_D$. The image processing section 44 is then configured to manipulate the real object major element image data retained in the data retaining section 42 based on the calculated conversion coefficient and update it as new real object major element image data.

The display signal generating section 43 is configured to generate a display signal for displaying the new real object major element image $G_{R1}$ based on the updated real object major element image data in the fourth screen area 54 and send the display signal to the display device 23. Simultaneously, the plan image $G_D$ is displayed based on the design plan data obtained by replacing the data related to the reference dots 68, the reference bolt lines 66 and the bolt dots 67 with the pre-manipulation data. Accordingly, a new composite image of the plan image $G_D$ and the real object major element image $G_{R1}$ based on the updated real object major element image data is displayed in the fourth screen area 54 as illustrated in FIG. 10(a).

Explanation of Diagram Operation of Reference Bolt Lines 66

Incidentally, each reference bolt line 66 is displayed as a line connecting six bolt dots 67. When the bolt dots 67 are herein dragged closer to or away from the corresponding reference dot 68 along the bolt diameter direction through an operation of the mouse 24, the image processing section 44 is configured to manipulate the design plan data retained by the data retaining section 42 so that the size of each reference bolt line 66 can be changed in conjunction with the operation of the mouse 24.

The display signal generating section 43 is configured to generate a display signal for displaying the plan image $G_D$ based on the design plan data manipulated by the image processing section 44 in the fourth screen area 54 and send the display signal to the display device 23. Accordingly, the size of each reference bolt line 66 to be displayed in the fourth screen area 54 can be changed in conjunction with the operation of the mouse 24. Therefore, a zoom-in/zoom-out operation of each reference bolt line 66 can be easily executed.

On the other hand, when the bolt dots 67 are dragged in the bolt circumference direction through an operation of the mouse 24, the image processing section 44 is configured to manipulate the design plan data retained by the data retaining section 42 so that each reference bolt line 66 can be rotated about each reference dot 68.

The display signal generating section 43 is configured to generate a display signal for displaying the plan image $G_D$ based on the design plan data to be manipulated by the image processing section 44 in the fourth screen area 54 and send the display signal to the display device 23. Accordingly, each reference bolt line 66 to be displayed in the fourth screen area 54 can be rotated about each reference dot 68 in conjunction with the operation of the mouse 24. Therefore, a rotational operation of each reference bolt line 66 can be easily executed.

Aligning Step (2) of Reference Dots 68

Explanation of Processing Content of Step S10

In the fourth screen area 54, two reference dots 68 are more accurately moved to the center points of two bolts 10 in the real object major element image $G_{R1}$ through an operation of the mouse 24 in order to more accurately match the center points of two bolts in the real object major element image $G_{R1}$ and two reference dots 68 in the plan image $G_D$.

In this case, a user repeats the aforementioned zoom-in/zoom-out operation and rotational operation for the reference bolt lines 66 (see FIG. 10(a)) in order to completely match two reference bolt lines 66 with the contours of the heads of two bolts 10 in the real object major element image $G_{R1}$ as illustrated in FIG. 10(b). Accordingly it is possible to accurately match two reference dots 68 in the plan image $G_D$ and the center points of the heads of two adjacent bolts 10 in the real object major element image $G_{R1}$. It should be noted in the composite image that the size and the rotational center of the sprocket wheel 6 in the real object major element image $G_{R1}$ are herein matched with those in the plan image $G_D$ but the rotational angle of the sprocket wheel 6 in the real object major element image $G_{R1}$ is not matched with that in the plan image $G_D$. In other words, the reference tooth profile line 65 in the plan image $G_D$ does not correspond to the contour line of the tooth portions 6a of the sprocket wheel 6 in the real object major element image $G_{R1}$.

Image Processing Step (2)

Explanation of Processing Content of Step S11

When the fitting button 61 is pressed after the center points of two bolts 10 in the real object major element image $G_{R1}$ and two reference dots 68 in the plan image $G_D$ are accurately matched in the aligning step (2) of the reference dots 68, the image processing section 44 is configured to manipulate the real object major element image data retained by the data retaining section 42 so that the real object major element image $G_{R1}$ and the plan image $G_D$ can be equally scaled, and is configured to update it as new real object major element image data.

The display signal generating section 43 is configured to generate a display signal for displaying a new real object major element image $G_{R1}$ based on the updated real object major element image data in the fourth screen area 54 and send the display signal to the display device 23. Accordingly, a new composite image, obtained by synthesizing the real object major element image $G_{R1}$ and the plan image $G_D$ at an equal scale, is displayed in the fourth screen area 54 as illustrated in FIG. 10(b).

Figure 10:
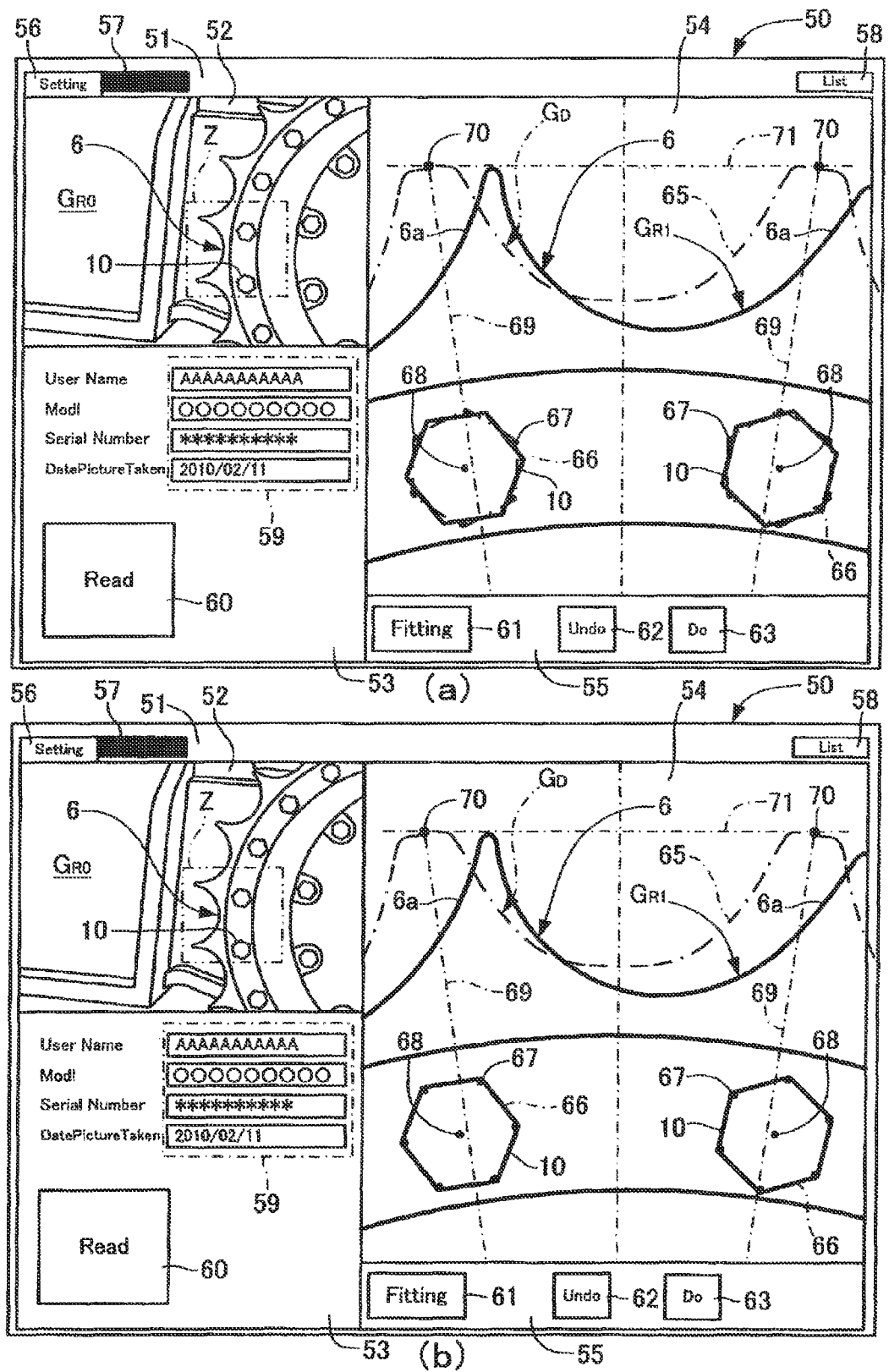
FIG. 10 is a diagram (4) for explaining the wear amount measuring procedure of the sprocket wheel.
Figure 11:
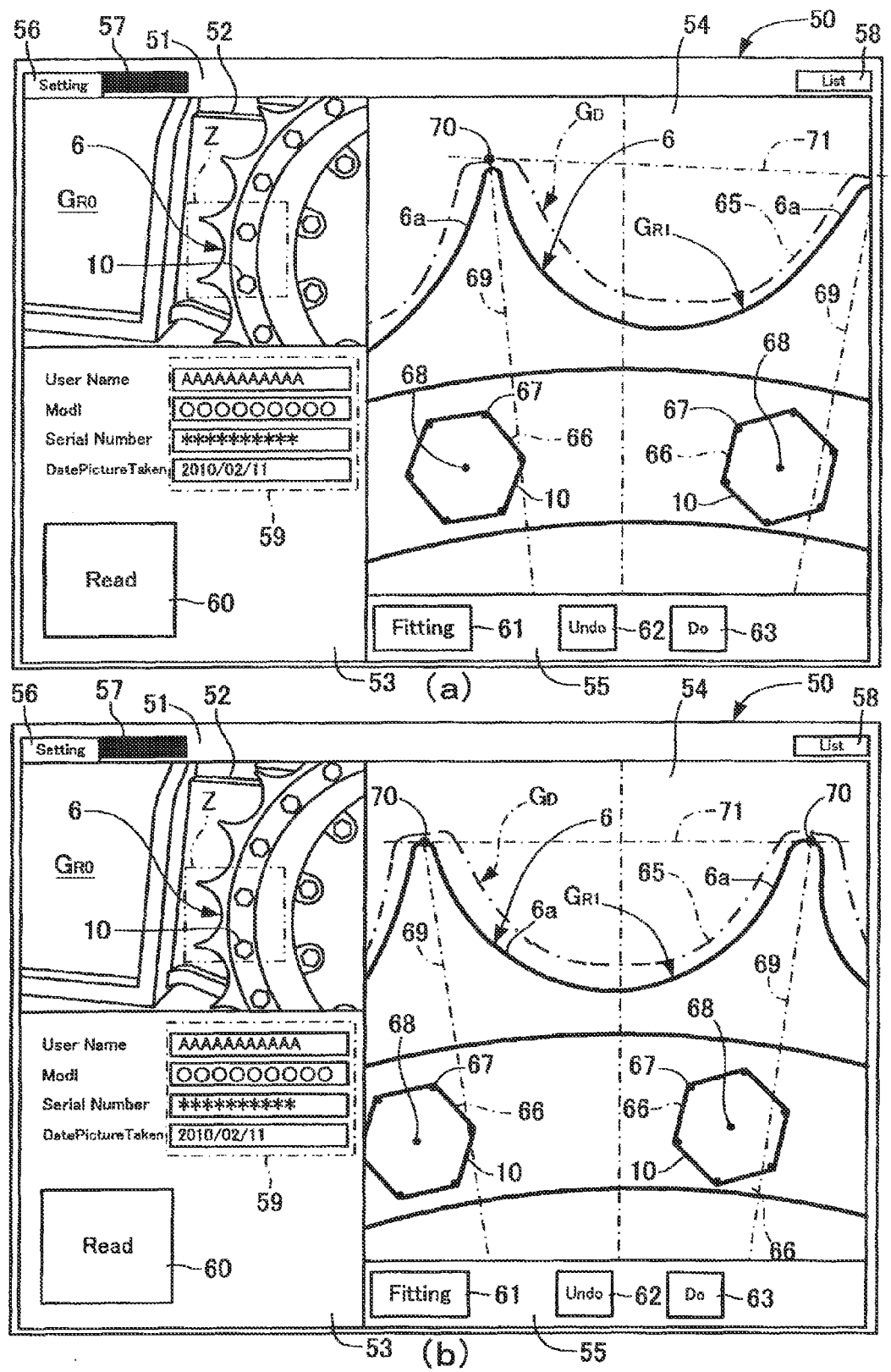
FIG. 11 is a diagram (5) for explaining the wear amount measuring procedure of the sprocket wheel.
Figure 12:
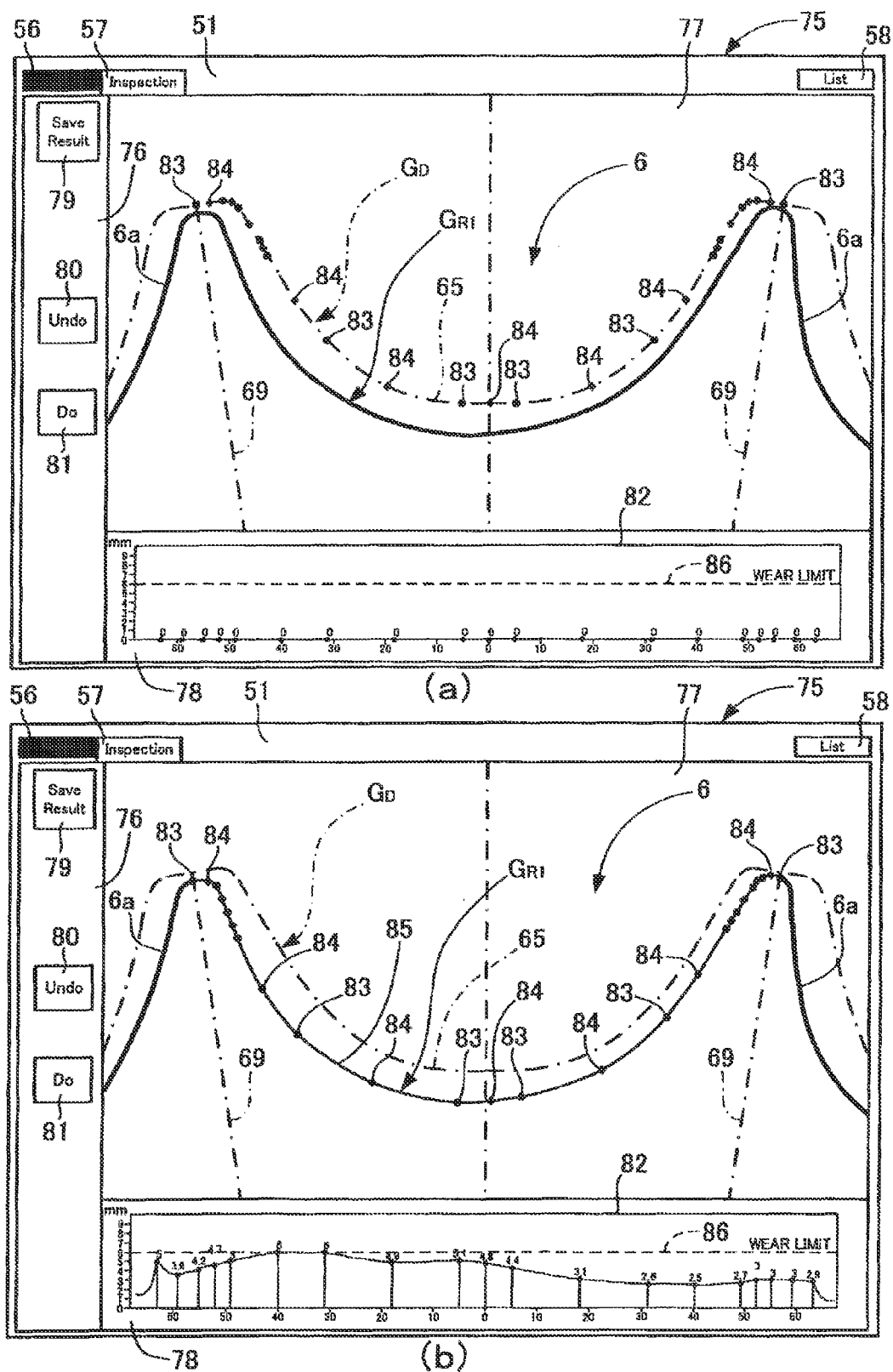
FIG. 12 is a diagram (6) for explaining the wear amount measuring procedure of the sprocket wheel.

It should be noted in the present exemplary embodiment that the tooth portion 6a of the sprocket wheel 6 has a circular symmetric phase about the reference circle center point different from that of the bolts 10 (the tooth portions are arranged in a 24-fold symmetric pattern whereas the bolts are arranged in an 18-fold symmetric pattern). With the configuration, screens illustrated in FIGS. 10(a) and 10(b) are displayed. By contrast, when the phases are matched (e.g., both of the tooth portions and the bolts have the pattern of 24-times symmetry), the plan image $G_D$ and the real object major element image $G_{R1}$ can be corresponded to each other in this stage. In this case, the screen display is immediately shifted from FIG. 9(b) to FIG. 11(a). In other words, when the plan image $G_D$ and the real object major element image $G_{R1}$ are synthesized and displayed on the same screen while being matched based on the positions of two adjacent bolts 10 (i.e., reference points) as a reference part, it is possible to display the plan image $G_D$ and the real object major element image $G_{R1}$ under the condition that their positions and the sizes are corresponded to each other.

Aligning Step of Tooth Tips

Explanation of Processing Content of Step S12

When the tooth tip dots 70 are dragged in the circumferential direction of the sprocket wheel 6 through an operation of the mouse 24, the image processing section 44 is configured to manipulate the design plan data regarding the reference tooth profile line 65, which is retained by the data retaining section 42, so that the reference tooth profile line 65 can be rotated about the rotational center of the sprocket wheel 6 (see FIG. 11(a)).

The display signal generating section 43 is configured to generate a display signal for displaying the plan image $G_D$ in the fourth screen area 54 based on the design plan data to be manipulated by the image processing section 44 and send the display signal to the display device 23. Accordingly, it is possible to rotate the reference tooth profile line 65 to be displayed in the fourth screen area 54 about the rotational center of the sprocket wheel 6 in conjunction with the operation of the mouse 24. Therefore, a rotational operation of the reference tooth profile line 65 can be easily executed. Through the rotational operation of the reference tooth profile line 65, the reference tooth profile line 65 is aligned with the tooth portions 6a of the sprocket wheel 6 in the real object major element image $G_{R1}$ in order to match the rotational angle of the sprocket wheel 6 in the real object major element image $G_{R1}$ with that of the reference tooth profile line 65. The tooth tip connection line 71 is herein displayed between adjacent tooth tip dots 70 in the form of a conceptual line. When these tooth tip dots 70 are dragged to the center points of the tooth tips in the real object major element image $G_{R1}$ along the reference tooth tip lines 69 (i.e., dragged in the radial direction) and the rotational angle is adjusted with the tooth tip connection line 71 being visually checked, it is possible to more accurately match the rotational angle of the sprocket wheel 6 in the real object major element image $G_{R1}$ and that of the reference tooth profile line 65.

It should be noted that not the size of but only the rotational angle of the sprocket wheel 6 in the real object major element image $G_{R1}$ is modified by the circumferential drag of the tooth tip dots 70. On the other hand, only the position of the tooth tip connection line 71 on the screen is changed by the radial drag of the tooth tip dots 70 while the other data is not thereby affected.

Image Processing Step (3)

Explanation of Processing Content of Step S13

When the fitting button 61 is pressed after the rotational angle of the sprocket wheel 6 in the real object major element image $G_{R1}$ and that of the reference tooth profile line 65 are accurately matched in the aligning step of the tooth tips, the image processing section 44 is configured to manipulate the real object major element image data retained by the data retaining section 42 so that the rotational angle of the sprocket wheel 6 in the real object major element image $G_{R1}$ can be equal to that of the reference tooth profile line 65 in the plan image $G_D$, and is configured to update it as new real object major element image data.

The display signal generating section 43 is configured to generate a display signal for displaying the new real object major element image $G_{R1}$ based on the updated real object major element image data in the fourth screen area 54 and send the display signal to the display device 23. Accordingly, a new composite image, obtained by synthesizing the sprocket wheel 6 in the real object major element image $G_{R1}$ and the reference tooth profile line 65 in the plan image $G_D$ at an equal rotational angle, is displayed in the fourth screen area 54 as illustrated in FIG. 11(b).

Explanation of Method of Further Enhancing Measurement Precision

It should be noted in the present exemplary embodiment that the processing flow proceeds to Step S14 after the processing of Step S13 is finished. However, it is possible to further enhance precision in measurement when the processing flow returns to Step S8 and then Steps S8 to S13 are repeated after Step S13 is finished.

Wear Amount Measurement Screen Display Step

Explanation of Processing Content of Step S14

When the wear amount measurement mode button 57 is clicked through an operation of the mouse 24, the display signal generating section 43 is configured to generate a display signal for displaying a wear amount measurement screen 75 illustrated in FIG. 12(a) in the display device 23 and send the display signal to the display device 23. Accordingly, the wear amount measurement screen 75 illustrated in FIG. 12(a) is displayed in the display device 23.

Explanation of Display Content of Respective Screen Areas in Wear Amount Measurement Screen The wear amount measurement screen 75, illustrated in FIG. 12(a), is herein a screen for editing images in the wear amount measurement mode and includes a sixth screen area 76, a seventh screen area 77 and an eighth screen area 78.

A measurement result saving button 79, an undo button 80, a redo button 81 and etc. are displayed in the sixth screen area 76.

Major elements of the composite image displayed in the fourth screen area 54 as a result of the processing of Step S13 (i.e., the image processing step (3)) are displayed in the seventh screen area 77.

A chart 82 representing a measurement result of the wear amount is displayed in the eighth screen area 78.

Display Step of Position Setting Dots 83 and Curvature Setting Dots 84

Explanation of Processing Content of Step S15

A plurality of position setting dots 83 and a plurality of curvature setting dots 84 are herein alternately displayed on the reference tooth profile line 65. The respective dots 83 and 84 can be moved to an arbitrary position through a user's operation of the mouse 24.

Aligning Step of Position Setting Dots 83

Explanation of Processing Content of Step S16

When the position setting dots 83 are dragged through an operation of the mouse 24, the image processing section 44 is configured to manipulate the design plan data retained by the data retaining section 42 so that only the positions of the position setting dots 83 can be modified without changing curvature between every pair of two adjacent curvature setting dots 84.

The display signal generating section 43 is configured to generate a display signal for displaying the plan image $G_D$ based on the design plan data to be manipulated by the image processing section 44 in the seventh screen area 77 and send the display signal to the display device 23. Accordingly, the plan image $G_D$ is displayed under the condition that only the positions of the position setting dots 83 are modified without changing curvature between every pair of two adjacent curvature setting dots 84.

Aligning Step of Curvature Setting Dots

Explanation of Processing Content of Step S17

When the curvature setting dots 84 are dragged through an operation of the mouse 24, the image processing section 44 is configured to manipulate the design plan data retained by the data retaining section 42 so that curvature of the reference tooth profile line 65 between every pair of two adjacent position setting dots 83 can be modified depending on the dragged position.

The display signal generating section 43 is configured to generate a display signal for displaying the plan image $G_D$ based on the design plan data to be manipulated by the image processing section 44 in the seventh screen area 77 and send the display signal to the display device 23. Accordingly, the plan image $G_D$ is displayed under the condition that curvature of the reference tooth profile line 65 between every pair of two adjacent position setting dots 83 is modified.

Drawing Step of Modified Tooth Profile Line

Explanation of Processing Content of Step S18

When the respective position setting dots 83 are moved on the tooth profile line of the real object major element image $G_{R1}$ through an operation of the mouse 24, and subsequently, the respective curvature setting dots 84 a real so moved on the tooth profile line of the real object major element image $G_{R1}$, the reference tooth profile line 65 displayed in the seventh screen area 77 can be matched with the tooth profile line of the real object major element image $G_{R1}$ as illustrated in FIG. 12(b). The matched tooth profile line is herein defined as a modified tooth profile line 85. The data retaining section 42 is configured to retain data related to the modified tooth profile line 85.

Wear Amount Computing Step

Explanation of Processing Content of Step S19

The wear amount computing section 45 is configured to compute the wear amount of the tooth portions 6a of the sprocket wheel 6 based on the displacement amount from the reference tooth profile line 65 to the modified tooth profile line 85 corresponding thereto, in other words, based on the magnitude of the interval between the modified tooth profile line 85 and the reference tooth profile line 65. Subsequently, the data retaining section 42 is configured to retain data related to the computed wear amount.

Wear Amount Display Step

Explanation of Processing Content of Step S20

The display signal generating section 43 is configured to generate a display signal for displaying the chart 82 based on the wear amount related data retained by the data retaining section 42 in the eighth screen area 78 and send the display signal to the display device 23. Accordingly, the chart 82 is displayed in the eighth screen area 78 where the vertical axis represents the wear amount of the tooth portions 6a of the sprocket wheel 6 while the horizontal axis represents positions on the reference tooth profile line 65 linearly developed.

It should be noted that the chart 82 represents with specific numeric values how much and which part of the tooth portions 6a of the sprocket wheel is worn away and displays a wear limit line 86 indicating the limit of wear amount that the sprocket wheel 6 is desirably replaced.

Explanation of Working Effects of Wear Amount Measuring Device 20 of Present Exemplary Embodiment According to the wear amount measuring device 20 of the present exemplary embodiment, it is possible to accurately compute how much and which part of a complex curved element such as the tooth portions 6a of the sprocket Wheel 6 is worn away regarding the entire shape thereof using the chart 82 illustrated in FIG. 12(b). Therefore, it is possible to easily confirm whether or not the wear amount of the tooth portions 6a of the sprocket wheel 6 exceeds a predetermined wear limit.

As a result, the wear amount measuring device 20 of the present exemplary embodiment can achieve advantageous effects of: (1) inhibiting cost required for unnecessary replacement of components; and (2) preventing troubles in travelling due to missing of replacement timing.

Explanation of Term Correspondence

The sprocket wheel 6 corresponds to "a wear amount measurement target" of the present invention. As to the image, on the other hand, the contour line of the tooth tips of the sprocket wheel 6 corresponds to "the wear amount measurement target" of the present invention.

The center point of each bolt 10 corresponds to "a measurement-related positioning reference" of the present invention.

Each bolt 10 corresponds to "a reference part" of the present invention. In the present exemplary embodiment, two adjacent bolts are set as the reference part. However, three or more adjacent bolts may be set as the reference part.

In short, the center points of two bolts 10 adjacent to each other are used as the measurement-related positioning references of the sprocket wheel 6 in the present exemplary embodiment. Each of the two center points corresponds to "a reference point" of the present invention. Further, two bolts 10 adjacent to each other are used as the reference part corresponding to the references. It should be noted in the present exemplary embodiment that the rotational angle of the sprocket wheel 6 is further used as the measurement-related positioning reference while the tooth tips of the tooth portions 6a of the sprocket wheel 6 are used as the reference parts.

The structure including the display device 23 and the display signal generating section 43 corresponds to "an image display unit" of the present invention.

The image processing section 44 corresponds to "an image processing unit" of the present invention.

The wear amount computing section 45 corresponds to "a wear amount computing unit" of the present invention.

The reference tooth profile line 65 corresponds to "a plan contour line" of the present invention.

The modified tooth profile line 85 corresponds to "a measurement contour line" of the present invention.

The wear amount measuring program, created based on the algorithm represented in the flowchart of FIG. 6, corresponds to "a program" of the present invention.

The DVD-ROM 28 corresponds to "a storage medium" of the present invention.

The wear amount measuring device, the wear amount measuring method, the program and the storage medium according to the present invention have been explained based on an exemplary embodiment. However, the present invention is not limited to the structures and configurations described in the aforementioned exemplary embodiment. The structures and configurations can be herein arbitrarily changed without departing from the scope of the present invention.

Explanation of Other Examples of Wear Amount Measurement Target

In the aforementioned exemplary embodiment, an example is described that the sprocket wheel 6 is used as the wear amount measurement target and the wear amount of the tooth portions 6a of the sprocket wheel 6 is measured. However, the present invention is not limited to the exemplary embodiment. For example, the link assemblies 11 illustrated in FIG. 2(b) may be used as the wear amount measurement target.

In this case, it is required to measure the wear amount of the tread surfaces 11a of the link assemblies 11.

Similarly to the sprocket wheel 6 of the aforementioned exemplary embodiment, it is herein possible to externally take a picture of the link assemblies 11 mounted on a work vehicle. Therefore, it is possible to easily obtain the real object image data.

In this case, the center points of a pair of track pins 12 adjacent to each other in a side view (i.e., a point of sight as seen in FIG. 2(b)) are set as the measurement-related positioning references, while a pair of the track pins 12 are set as the reference part for defining the references. Based on the references, the absolute value of the wear amount of the tread surface 11a can be measured. Alternatively, the front end and the rear end of the tread surface 11a may be used as the measurement-related positioning reference and the reference part. In this case, relative difference in wear amount on the tread surfaces 11a is measured. However, the life duration of the link is determined by uneven wear on the tread surfaces 11a. Therefore, the replacement timing can be determined based on the relative wear amount on the tread surfaces 11a.

As to the track-tyre drive unit 1 equipped with the crawler belt 7 wound thereabout in an oval shape, the tread surfaces 11a of the link assemblies 11 may be displayed with a line having three dips in a side view in accordance with the status of usage, and it may be determined that the replacement timing has come when the depth of the center dip exceeds a predetermined value.

The wear amount measuring device, the wear amount measuring method, the wear amount measuring program and the storage medium according to the illustrated embodiment can be all preferably used for applications of measuring the wear amount of an expendable part that has a complex shape and progression of wear varies from position to position.

The invention claimed is:

1. A wear amount measuring device comprising:
   a computer including a
      storage device having a wear amount measuring program stored therein, and
      a processor configured to execute the wear amount measuring program; and
   an image display device operatively coupled to the computer and configured to display an image based on a display signal received from the computer,
   the wear amount measuring program being configured to cause the image display device to
      display a real object image of a replaceable component based on real object image data containing a real wear amount measurement target and a real reference part of the replaceable component, the real reference part functioning as a measurement-related positioning reference for the real wear amount measurement target, and
      display a plan image based on design plan data corresponding to the replaceable component in an unused state, the design plan data containing a plan wear amount measurement target and a plan reference part, the plan wear amount measurement target and the plan reference part corresponding to the real wear amount measurement target and the real reference part, respectively,
   the wear amount measuring program including
      an image processing section configured to execute an image processing of overlapping the real object image and the plan image at an equal scale on a corresponding positional relation when the real reference part in the real object image and the plan reference part in the plan image are matched, and
      a wear amount computing section configured to compute a wear amount based on a magnitude of an interval between a measurement contour line drawn along an outer peripheral contour of the real wear amount measurement target in the real object image and a plan outer peripheral contour line in the plan image.

2. The wear amount measuring device recited in claim 1, wherein
   the replaceable component is a sprocket wheel having a plurality of tooth portions on an outer periphery thereof, the wear amount measurement target including at least one of the tooth portions, and
   the reference part includes at least two bolts for securing the sprocket wheel to a sprocket hub as an attachment target of the sprocket wheel.

3. The wear amount measuring device recited in claim 1, wherein
   the replaceable component is a sprocket wheel having a plurality of tooth portions on an outer periphery thereof, the wear amount measurement target including at least one of the tooth portions, and
   the reference part includes two bolts for securing the sprocket wheel to a sprocket hub as an attachment target of the sprocket wheel and tooth tips of the sprocket wheel.

4. The wear amount measuring device recited in claim 2, wherein
   real object image is captured while the sprocket wheel is installed in a work vehicle in a service state.

5. The wear amount measuring device recited in claim 1, wherein
   the real object image is an image of the replaceable component captured while the replaceable component is in a service state.

6. The wear amount measuring device recited in claim 1, wherein
   the real object image is a digital photograph captured with a digital camera and read from the camera or an external memory device to the computer.

7. The wear amount measuring device recited in claim 1, wherein
   the wear amount measuring program is configured to allow a user to align the real reference parts and the design reference parts with respect to each other manually while viewing the image display device.

8. The wear amount measuring device recited in claim 7, wherein
the wear amount measuring program is configured to allow a user to align the real reference parts and the design reference parts with respect to each other using a computer mouse.

9. The wear amount measuring device recited in claim 1, wherein the wear amount measuring program is further configured to display the computed wear amount together with a predetermined wear limit on the image display device, the computed wear amount including specific numeric values indicating the computed wear amount corresponding to a plurality of positions along the outer peripheral contour of the wear amount measurement target, the predetermined wear limit indicating wear amount at which it is desirable to replace the replaceable component.

10. A wear amount measuring method comprising:
an image displaying step of:
displaying a real object image of a replaceable component based on real object image data containing a real wear amount measurement target and a real reference part of the replaceable component, the reference part functioning as a measurement-related positioning reference for the real wear amount measurement target, and
displaying a plan image based on design plan data corresponding to the replaceable component in an unused state, the design plan data containing a plan wear amount measurement target and a plan reference part of the replaceable component, the plan wear amount measurement target and the plan reference part corresponding to the real wear amount measurement target and the real reference part, respectively;
an image processing step of executing an image processing of overlapping the real object image and the plan image at an equal scale on a corresponding positional relation when the real reference part in the real object image and the plan reference part in the plan image are matched; and
a wear amount computing step of computing a wear amount based on a magnitude of an interval between a measurement contour line drawn along a outer peripheral contour of the wear amount measurement target in the real object image and a plan outer peripheral contour line in the plan image.

11. The wear amount measuring method recited in claim 10, wherein
the reference part includes a plurality of reference points separated away from each other, the reference points being visible in a usage state of the replaceable component.

12. The wear amount measuring method recited in claim 11, wherein
the image processing step includes the sub-steps of:
displaying an image obtained by matching a plurality of reference points in a design image with the plural reference points in the real object image on a one-to-one basis;
converting the real object image displayed in the image displaying step at an equal scale to and on a corresponding positional relation with the plan image displayed in the image displaying step based on displacement between the plural reference points of the design image displayed in the sub-step and the plural reference points of the design image displayed in the image displaying step; and
displaying the converted real object image to be overlapped with the plan image.

13. The wear amount measuring method recited in claim 10, wherein
the replaceable component is a sprocket wheel having a plurality of tooth portions on an outer periphery thereof, the wear amount measurement target including at least one of the tooth portions, and
the reference part includes at least two bolts for securing the sprocket wheel to a sprocket hub as an attachment target of the sprocket wheel.

14. The wear amount measuring method recited in claim 10, further comprising:
a photographing step in which a digital photograph of the replaceable component is taken with a digital camera while the replaceable component in a service state;
a reading step in which the digital photograph is read from the camera or an external memory device to a computer; and
a wear amount measuring program executing step in which image displaying step and the image processing step are executed by the computer executing a wear amount measuring program.

15. The wear amount measuring method recited in claim 10, further comprising:
a wear amount displaying step in which the computed wear amount is displayed together with a predetermined wear limit, the computed wear amount including specific numeric values indicating the computed wear amount corresponding to a plurality of positions along the outer peripheral contour of the wear amount measurement target, the predetermined wear limit indicating wear amount at which it is desirable to replace the replaceable component.

16. A non-transitory computer-readable storage medium storing a wear amount measuring program configured to cause a computer to execute a wear amount measuring method, the wear amount measuring method comprising:
an image displaying step of:
displaying a real object image of a replaceable component based on real object image data containing a real wear amount measurement target and a real reference part of the replaceable component, the reference part functioning as a measurement-related positioning reference for the real wear amount measurement target, and
displaying a plan image based on design plan data corresponding to the replaceable component in an unused state, the design plan data containing a plan wear amount measurement target and a plan reference part of the replaceable component, the plan wear amount measurement target and the plan reference part corresponding to the real wear amount measurement target and the real reference part, respectively;
an image processing step of executing an image processing of overlapping the real object image and the plan image at an equal scale on a corresponding positional relation when the real reference part in the real object image and the plan reference part in the plan image are matched; and
a wear amount computing step of computing a wear amount based on a magnitude of an interval between a measurement contour line drawn along a outer peripheral contour of the wear amount measurement target in the real object image and a plan outer peripheral contour line in the plan image.

17. The non-transitory computer-readable storage medium wear amount measuring program recited in claim 16, wherein
the image processing step includes the sub-steps of:
- displaying an image obtained by matching a plurality of reference points in a design image with the plural reference points in the real object image on a one-to-one basis;
- converting the real object image displayed in the image displaying step at an equal scale to and on a corresponding positional relation with the plan image displayed in the image displaying step based on displacement between the plural reference points of the design image displayed in the sub-step of displaying the image obtained by matching and the plural reference points of the design image displayed in the image displaying step; and
- displaying the converted real object image to be overlapped with the plan image.

18. The non-transitory computer-readable storage medium recited in claim 16, wherein
the replaceable component is a sprocket wheel having a plurality of tooth portions on an outer periphery thereof, the wear amount measurement target including at least one of the tooth portions,
the reference part includes at least two bolts for securing the sprocket wheel to a sprocket hub as an attachment target of the sprocket wheel, and
real object image is an image captured while the sprocket wheel is installed in a work vehicle in a service state.

19. The non-transitory computer-readable storage medium recited in claim 16, wherein
the wear amount measuring program is further configured to display the computed wear amount together with a predetermined wear limit on the image display device, the computed wear amount including specific numeric values indicating the computed wear amount corresponding to a plurality of positions along the outer peripheral contour of the wear amount measurement target, the predetermined wear limit indicating wear amount at which it is desirable to replace the replaceable component.

20. The non-transitory computer-readable storage medium recited in claim 16, wherein
the wear amount measuring program is configured to allow a user to align the real reference parts and the design reference parts with respect to each other manually while viewing the real object image and the plan image on an image display device that is coupled to the computer.

* * * * *